(12) United States Patent
Lin et al.

(10) Patent No.: US 6,580,544 B1
(45) Date of Patent: Jun. 17, 2003

(54) METHOD AND APPARATUS FOR AUTOMATICALLY CORRECTING A BIAS VOLTAGE ON AN OPTICAL MODULATOR OF EXTERNAL-MODULATION OPTICAL EMITTER

(75) Inventors: Ming-Chung Lin, Tainan (TW); Yu-Hao Hsu, Chiayii (TW); Chih-Jung Kao, Miaoli Hsien (TW)

(73) Assignee: New Elite Technologies, Inc., Hsinchu (TW)

( * ) Notice: Subject to any disclaimer, the term of this patent is extended or adjusted under 35 U.S.C. 154(b) by 0 days.

(21) Appl. No.: 10/109,833

(22) Filed: Mar. 27, 2002

(30) Foreign Application Priority Data

Jan. 11, 2002 (TW) ........................................ 91100278 A

(51) Int. Cl.[7] .............................................. G02B 26/00
(52) U.S. Cl. ........................ 359/239; 359/337; 385/14; 385/16; 385/22
(58) Field of Search ................................. 359/237–240, 359/341.1, 344, 337–339; 385/14, 16, 22

(56) References Cited

U.S. PATENT DOCUMENTS 5,453,608 A * 9/1995 Conder et al. ............... 250/205
6,317,247 B1 * 11/2001 Yang et al. .................. 359/245
6,392,779 B1 * 5/2002 Iannelli et al. .............. 359/245

* cited by examiner

Primary Examiner—Evelyn Lester
(74) Attorney, Agent, or Firm—J.C. Patents

(57) ABSTRACT

A control method and apparatus used for a bias controller of automatic bias correction on an optical modulator of optical emitter of external modulation type is a close-loop control system, composed of a base signal generator, an optical receiver, a second-order harmonic signal generator, a second-order harmonic signal detector, a DC amplifier, and a temperature automatic correction device. The bias voltage point of the optical modulator can remain a constant, whereby the optical power can be exported in stable level and distortion of transmission is reduced. It can be avoided about the effect of the environmental temperature, resulting in the change of optical output and the additional signal distortion of the transmission signal.

21 Claims, 5 Drawing Sheets

METHOD AND APPARATUS FOR AUTOMATICALLY CORRECTING A BIAS VOLTAGE ON AN OPTICAL MODULATOR OF EXTERNAL-MODULATION OPTICAL EMITTER

CROSS-REFERENCE TO RELATED APPLICATION

This application claims the priority benefit of Taiwan application Ser. No. 91100278, filed Jan. 11, 2002.

BACKGROUND OF THE INVENTION

1. Field of Invention

The present invention relates to a control technology and apparatus for bias correction on an optical modulator of optical emitter of external modulation type. More particularly, the present invention relates to a control method and apparatus used for a bias controller of automatic bias correction on an optical modulator of optical emitter of external modulation type.

2. Description of Related Art

In recent years, the optical fiber communication in the world has been well and greatly developed in flourish, wherein the internet and the cable TV have astonishing development. Under attraction of great business chance in the market with a large number of users, all dealers of the optical fiber communication have been developing for the goals of longer distance in fiber communication, wider bandwidth, and better quality. In FIG. 1, since the optical-fiber emitter 110 with a wavelength of 1559 nm can have low distortion and low insertion loss, and can implement with an optical amplifier 120, an optical receiver 130, so as to have the long distance network transmission with high quality. Therefore, it is greatly pushed and made to wide applications. In FIG. 2A and FIG. 2B, the optical-fiber emitter can also be divided into a direct modulation type optical emitter and an external-modulation type optical emitter as shown in FIGS. 2A and 2B. The main difference of them is that the direct-modulation type optical emitter 240 is directly adding the transmission signal RF to the laser source 210, whereby an optical form is exported through the optical amplifier. Also and, the external-modulation type optical emitter 280 is that when the output of the laser source 250 is input to the optical modulator 260, the transmission signal 250 is externally added to the optical modulator 260. Then, the optical amplifier 270 amplifies the signal and exports the optical output. The characteristic curve of the optical modulator is shown in FIG. 3. In FIG. 3, it is observed that the characteristic of the optical modulation can be changed by using the external bias. In general, if it is applied on the high linear transmission system, such as the analog signals of the cable TV, the optical modulation bias can be adjusted to be located at the Quad point, so as to obtain the second order linearity with less distortion. If it is applied on the digital transmission system, the bias can be set at the peak or the null.

However when it is in the practical application, a phenomenon is found that the bias point of the optical modulator used in a high linear transmission system will shift along with the environmental temperature. If the bias point of the optical modulator has an error greater than +/−1 degree, it would cause the distortion of the second order non-linearity to be severely degraded. Therefore, for an optical emitter with external modulation type in commercial use, in order to obtain the high linear transmission with low distortion, it is necessary to set the bias voltage of the optical modulator to the bias point Quad. Also and, an offset is made on the shift of bias point Quad, which is caused by the temperature.

Currently, many solutions, such as the U.S. Pat. No. 5,812,297 and U.S. Pat. No. 5,343,324, are proposed on the bias voltage control of the optical modulator. FIG. 4 is a conventional bias voltage controller of optical modulator of optical emitter for a external modulation type. The conventional bias voltage controller uses a 10.85 MHz signal generator 410 to generate a 10.85 MHz base signal, which is combined with a DC voltage and then sent to a bias voltage input terminal of the optical modulator. When a shift occurs at the best bias point of the optical modulator, that is the Quad point in FIG. 3, it will cause a distortion of the second order non-linearity in the transmission signal transmitted by the optical modulator. Then, a signal of 21.7 MHz is generated from the transmission signal exported by the optical modulator. This transmission signal goes through an optical coupler with 90:10 splitting and enters an optical receiver 420, so as to convert the transmission signal into an electrical signal. The electrical signal is input to a wave detector 430. The wave detector 430 can be a multiplying wave detector, a diode wave detector, an integrated circuit, or a discrete circuit. The wave detector 430 generates an error voltage, according to an amplitude and a phase of the signal of 21.7 MHz. The error voltage could be very small, and is necessary to be amplified by a DC-level amplifier 450 after passing the narrow-frequency low-pass filter 440. In order to filter out the noise after amplification, it has to pass another narrow-frequency low-pass filter 460. The error voltage is then enters a DC level shifter 470 for shifting the error voltage to a level, which is acceptable by the microprocessor 490. An analog-to-digital converter (ADC) 480 further converts the error voltage and exports the output to the microprocessor 490. According to the quantity of the error voltage, the microprocessor 490 controls a digital-to analog converter (DAC) 495 to export an offset voltage, so as to correct the bias voltage point of the optical modulator to the Quad point.

However, both the wave detector and the DC amplifier themselves have characteristic of producing compensation effect and zero-point shifting effect. In this situation, when the temperature changes, they will produce an extra voltage to the output of the bias voltage controller. This voltage would cause that the bias voltage controller cannot provide a proper offset voltage for correcting the bias voltage of the optical modulator to remain at the Quad point.

SUMMARY OF THE INVENTION

The invention provides a control method and an apparatus used for a bias controller of automatic bias correction on an optical modulator of external-modulation optical emitter. The correct offset voltage can be automatically measured and the correction is automatically made, so that the thermal effect can significantly reduced, and the output voltage can be adjusted.

The invention provides a control method for automatic bias correction on an optical modulator of external-modulation optical emitter. The bias controller provides a base signal, which is also combined with a DC voltage to form a bias voltage control signal. When the bias voltage control signal is input to the optical modulator, the bias voltage controller also receives the output of a first second-order harmonic component signal from the optical modulator. The bias voltage controller also takes a second second-order harmonic component signal generated from a base signal generator, which has the same frequency as the first second-order harmonic component signal. The bias voltage controller compares the first second-order harmonic component signal with the second second-order harmonic component signal, so as to produce a DC voltage for controlling the bias voltage of the optical modulator. The automatic correcting method includes dividing the method into a measuring cycle and a correcting cycle. When the bias voltage controller is at the measuring cycle, the receiving terminal is grounded. Then, the extra offset voltage and the zero shifting voltage from the bias voltage controller are measured. When the bias voltage controller is at the correcting cycle, the receiving terminal receives the first second-order harmonic component signal, and then compares the first second-order harmonic component signal with the second second-order harmonic component signal, so as to obtain a DC error voltage. The DC error voltage is subtracted from the extra offset voltage and the zero shifting voltage, so as to obtain a corrected DC error voltage. The corrected DC voltage is used to control the bias voltage of the optical modulator.

The invention provides a correcting apparatus for automatically correcting an optical modulator of external-modulation optical emitter. When the correcting apparatus issues a bias voltage control signal to the optical modulator, the correcting apparatus also receives an output from the optical modulator about a first second-order harmonic component signal. According to the first second-order harmonic component signal, the correcting apparatus produces a DC voltage to control a bias voltage of the optical modulator. The correcting apparatus comprises a base signal generator, a combiner, an optical coupler device, an optical receiver, a resistor, a RF switch, a wave detector, a first narrow-band low pas filter (LPF), a DC amplifier, a second narrow-band LPF, a DC level shifter, an ADC, microprocessor, and a DAC. The base (tone) signal generator generates a base signal and produces a second second-order harmonic component signal based on the base signal. The combiner is coupled to the base signal generator to receive the base signal and the DC voltage, and export the bias voltage control signal to the optical modulator. The optical coupler receives and exports the first second-order harmonic component signal. The optical receiver receives the first second-order harmonic component signal from the optical coupler and exports it. The resistor has a first terminal and a second terminal, where the second terminal is connected to a ground voltage. The RF switch is used to select for receiving the first second-order harmonic component signal from the optical receiver or connecting to the resistor. The wave detector is coupled to the base signal generator and the RF switch, so as to export the first second-order harmonic component signal, the second second-order harmonic component signal, and a DC error voltage signal. The first narrow-band LPF is coupled to the wave detector. The DC amplifier is coupled to the first narrow-band LPF. The second narrow-band LPF is coupled to the DC amplifier. The DC level shifter is coupled to the second narrow-band LPF. The ADC is coupled to the second narrow-band LPF. The microprocessor is coupled to the ADC and the RF switch. The DAC is coupled to the microprocessor and the combiner, so as to export the DC voltage.

In summary, the invention employs the microprocessor to control the RF switch, so as to obtain the extra offset voltage and the zero shifting voltage induced by the loop circuit of the bias voltage controller. According to these two voltages, the actual error voltage is corrected, whereby the bias of the optical modulator can be set to the correct bias voltage point.

Additionally, a measuring cycle and a correcting cycle are repeated, so as to automatically correct the bias voltage controller. As a result, the temperature effect on the bias voltage shifting can be effectively reduced, and the voltage output of the bias voltage controller can be modulated.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

An apparatus used for automatic correcting bias voltage on an optical modulator of optical emitter, so as to measure the extra offset voltage and the zero shifting voltages, which is induced by each level of circuits due to the temperature effect, and accordingly provides a DC offset voltage. As a result, the bias voltage of the optical modulator can be located at the correct bias voltage point. Then an operation cycle is repeated to automatically correct the bias voltage.

Figure 1:
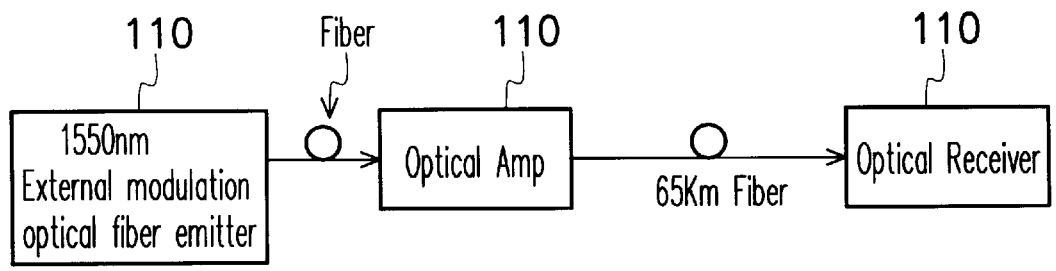
FIG. 1 is a conventional optical fiber transmission network.
Figure 2A:
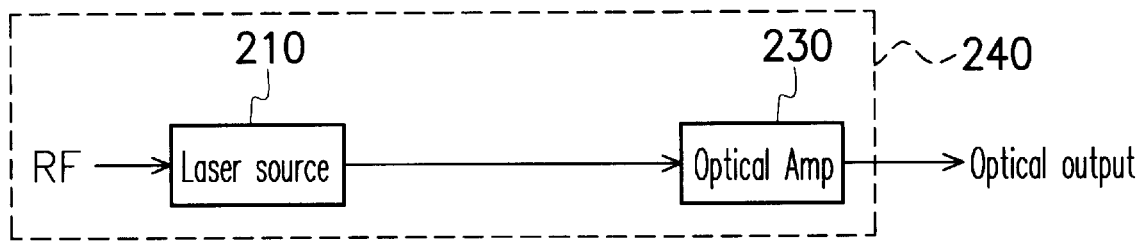
FIG. 2A is a circuit diagram, illustrating a conventional direct-modulation type optical emitter.
Figure 2B:
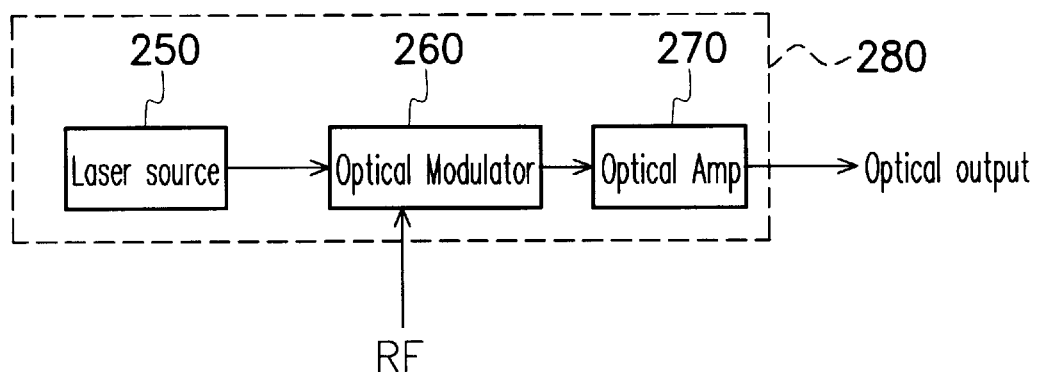
FIG. 2B is a circuit diagram, illustrating a conventional external-modulation type optical emitter.
Figure 3:
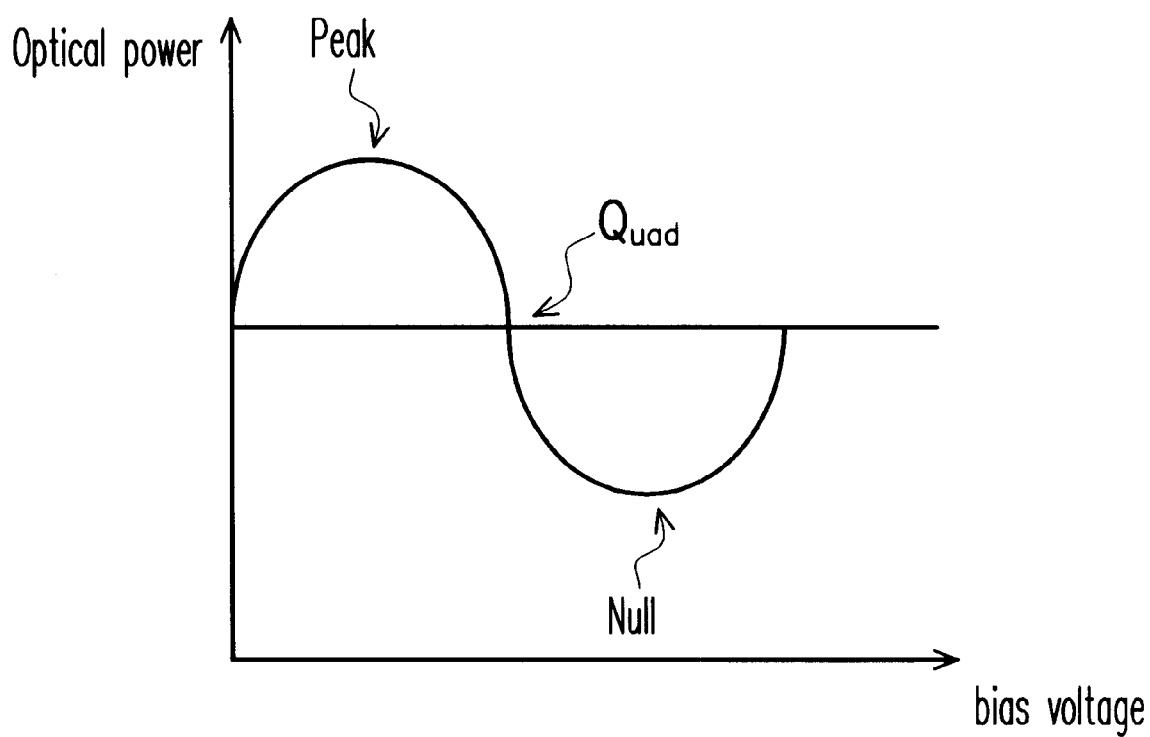
FIG. 3 is a characteristic curve of the optical modulator.
Figure 4:
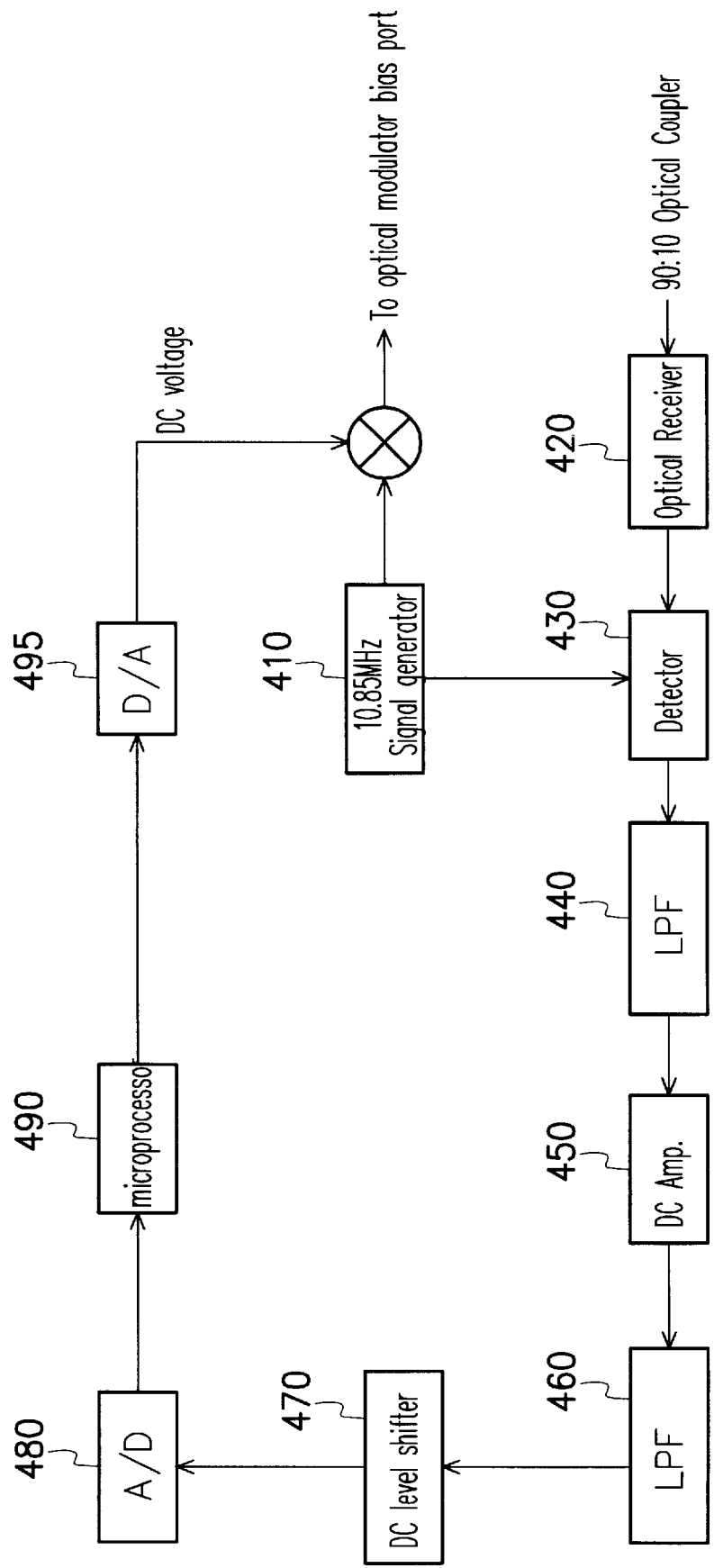
FIG. 4 is circuit diagram, illustrating a bias voltage controller of the conventional optical modulator for the external-modulation optical emitter.
Figure 5:
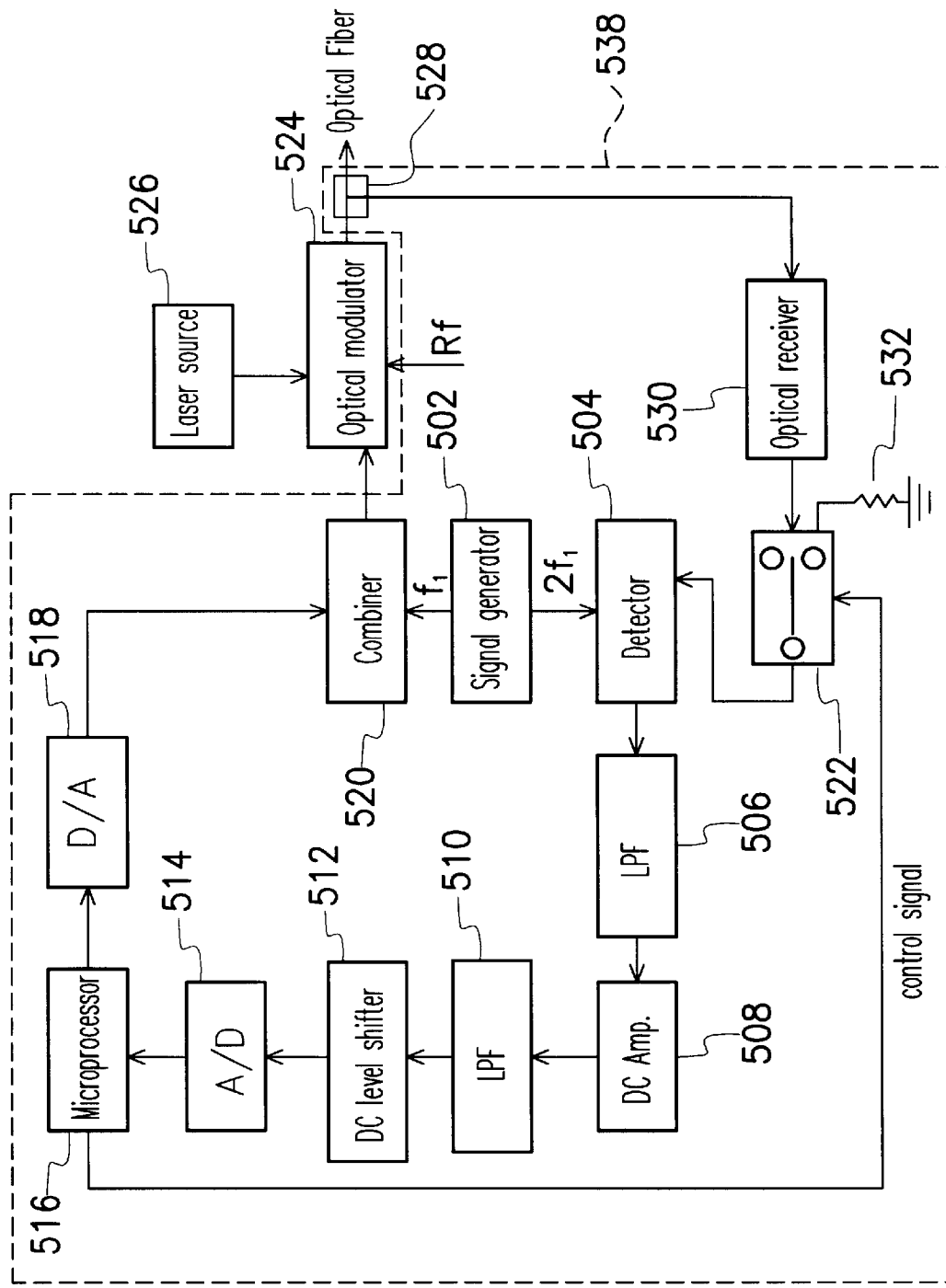
FIG. 5 is circuit diagram, schematically illustrating a bias voltage controller of the optical modulator for the external-modulation optical emitter, according to a embodiment of the invention.

Referring to FIG. 5, FIG. 5 is circuit diagram, schematically illustrating a bias voltage controller of the optical modulator for the external-modulation optical emitter, according to a embodiment of the invention. The bias voltage controller 538 is composed of a base signal generator 502, a combiner 520, an optical coupler device 528, an optical receiver 530, a resistor 532, a RF switch 522, a multiplying wave detector 504, a first narrow-band low-pass filter (LPF) 506, a DC amplifier 508, a second narrow-band LPF 510, a DC level shifter 512, an ADC 514, microprocessor 516, and a DAC 518. The RF switch 522 can include, for example, a semiconductor switch or a relay. Each of the low-pass filters 506, 510 includes, for example, a passive device, such as a capacitor, a resistor, or an inductor, or an active device, such as a transistor, a field-effect transistor, or an operational amplifier. The DC amplifier 508 includes, for example, a transistor, a field-effect transistor, or an operational amplifier. The ADC includes, for example, an integrated circuit or a discrete circuit. The DAC includes, for example, an integrated circuit or a discrete circuit. The discrete circuit includes, for example, a transistor, a field-effect transistor, or an operational amplifier.

In the invention, when the bias voltage controller 538 is to make bias voltage compensation on the optical modulator 524 under a temperature varying condition, the microprocessor 516 issues a control signal to the RF switch 522 to select for connecting to the ground through the resistor 532. Each level of circuits for the DAC 518, the combiner 520, the wave detector 504, the narrow-band LPF 506, the DC amplifier 508, the narrow-band LPF 510, the DC level shifter 512, the ADC 514 and the microprocessor 516 is led to the ground. Also and, the microprocessor 516 measures the output voltage of the ADC 514. This voltage is the extra offset voltage and the zero shifting voltage of the bias voltage controller 538 due to the temperature change.

When the extra offset voltage and the zero shifting voltage are obtained, the microprocessor 516 temporarily stores the two voltages for correction use, and issues another control signal to the RF switch 522 to cause a selection for connecting to the optical receiver 530. At this moment, the optical receiver 530 under the temperature effect would export an optical signal which carries a first second-order harmonic component signal, which has a frequency two times of the frequency of the base signal, that also is, a tone signal. The optical coupler 508 can decouple out the first second-order harmonic component signal and send it to the optical receiver 530. The first second-order harmonic component signal then enters the multiplying wave detector 504 through the optical receiver 530 and the RF switch 522. The wave detector 504 also receives a second second-order harmonic component signal from the base signal generator 502 with a frequency equal to the first second-order harmonic component signal. The wave detector 504 compares the amplitudes of the first and the second second-order harmonic component signals. The wave detector 504 then exports the DC error voltage signal, the first and the second second-order harmonic component signals to the LPF 506. These three signals go through the LPF 506 and only the DC error voltage signal is filtered out. Since the DC error voltage signal may be very small, it has to be amplified through the optical amplifier 508. After amplification, the amplified DC error voltage signal may carry noise and I necessary to be filtered again by the LPF 510. The filtered DC error voltage signal is then input to the DC level shifter 512. The DC level shifter 512 shifts the DC error voltage signal by a voltage level, so as to allow the DC error voltage signal to be operated by the ADC 514. In other words, all the waveform can completely pass the ADC 514. The DC error voltage signal is converted to a digital signal, so as to export it to the microprocessor 516. The digital signal received by the microprocessor 516 includes the extra offset voltage, the zero shifting voltage, and the error voltage signal induced by the optical modulator itself. The microprocessor 516 uses the subtraction operation to subtract the extra offset voltage and the zero shifting voltage from the bias voltage represented by the digital signal, so s to obtain the actual need of offset voltage for the optical modulator itself due to the temperature effect. The microprocessor 516 exports the offset voltage to the DAC 518 for converting into a DC voltage signal. The DC voltage signal is combined by the combiner 520 with the base signal and is send to the optical modulator 524. As a result, the bias voltage of the optical modulator 524 can be located at the best bias voltage point.

It acts as a measuring cycle when the microprocessor 516 is connected to the resistor 532 through the RF switch 522, and it acts as a correction cycle when the microprocessor 5 16 is connected to the optical receiver 530. The lasting periods for the two cycles are dependent on the variation rate of the environment temperate. By using these two cycles to periodically correct the bias voltage of the bias voltage controller 538, the voltage shift due the temperature effect can be effectively and automatically reduced. Also and, the voltage output of the bias voltage controller can be modulated. The bias voltage control in efficiency can be achieved.

Figure 6:
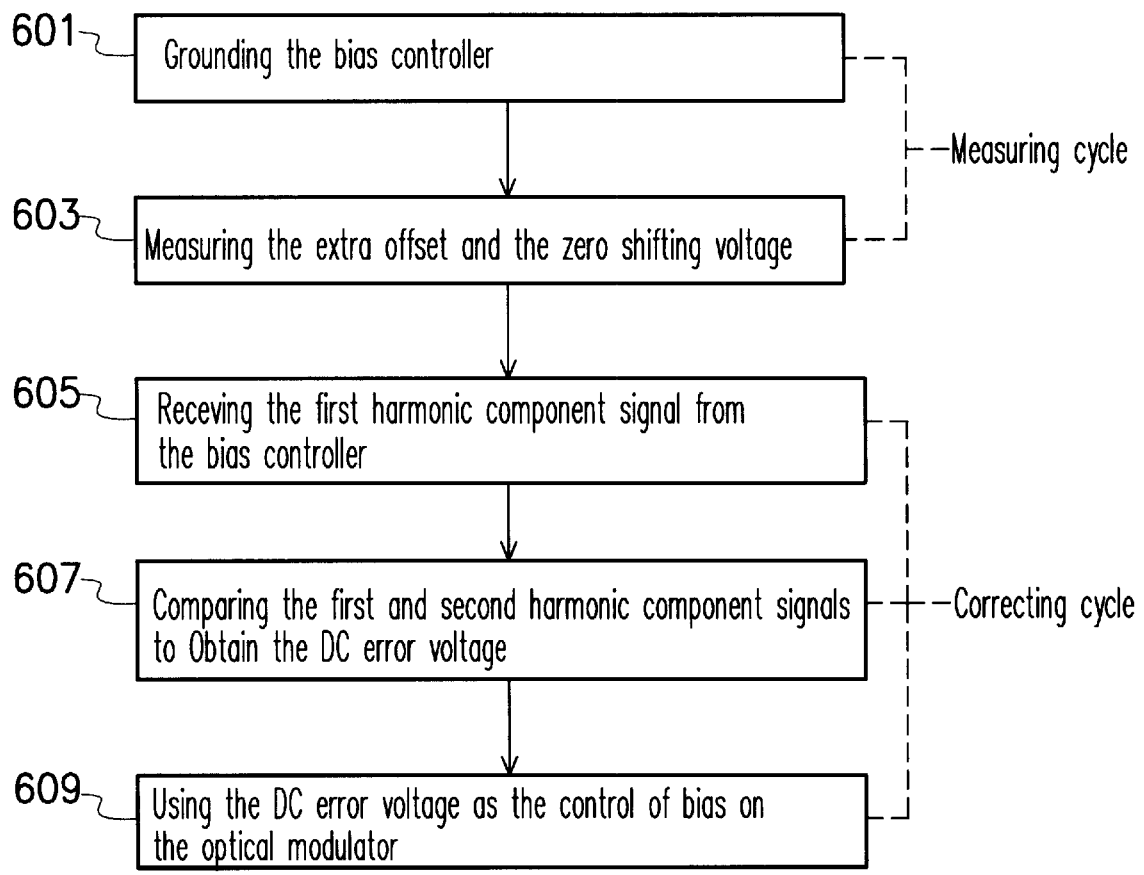
FIG. 6 is a procedure chart, schematically illustrating the control method for automatically correcting bias on an optical modulator, according to a embodiment of the invention.

The invention also provides a method for automatic correcting bias voltage on an optical modulator of optical emitter. In the method, the optical modulator receives the bias control signal, which is a combination of the base signal induced by the bias voltage controller and the DC voltage signal, and exports a first second-order harmonic component signal. The bias voltage controller receives the first second-order harmonic component signal in feedback manner, and generates a second second-order harmonic component signal based on the base signal. Wherein the first and the second second-order harmonic component signals have the same frequency and are compared to produce a DC voltage, which is used to control the bias voltage of the optical modulator. FIG. 6 is a procedure chart, schematically illustrating the control method for automatically correcting bias on an optical modulator, according to a embodiment of the invention. It includes two cycles: measuring cycle and correcting cycle.

When the bias voltage controller is at the measuring cycle, in step 601, the bias voltage controller does not receive the first second-order harmonic component signal. In step 603, the extra offset voltage and the zero shifting voltage for each level of circuit units in the bias voltage controller due to the temperature variation are measured. In step 605, when the bias voltage controller is at the correcting cycle, its receiving terminal selectively receives the first second-order harmonic component signal without being grounded. In step 607, the first and second second-order harmonic component signals are compared to obtain a DC error voltage. The DC error voltage is subtracted by the extra offset voltage and the zero shifting voltage, whereby a DC error voltage is obtained. In step 609, the DC error voltage is used to control the bias voltage of the optical modulator.

In conclusions, the invention uses the microprocessor to control the RF switch, so as to obtain the extra offset voltage and the zero shifting voltage induced by the loop circuit of the bias voltage controller. According to these two voltages, the actual error voltage is corrected, whereby the bias of the optical modulator can be set to the correct bias voltage point. Additionally, a measuring cycle and a correcting cycle are repeated, so as to automatically correct the bias voltage controller. As a result, the temperature effect on the bias voltage shifting can be effectively reduced, and the voltage output of the bias voltage controller can be modulated.

It will be apparent to those skilled in the art that various modifications and variations can be made to the structure of the present invention without departing from the scope or spirit of the invention. In view of the foregoing descriptions, it is intended that the present invention covers modifications and variations of this invention provided they fall within the scope of the following claims and their equivalents.

What is claimed is:

1. A method for automatic correcting a bias voltage on an optical modulator of an external-modulation optical emitter, wherein when the optical modulator receives a base control signal provided by a bias voltage controller, in which the base control signal includes a combination of a base signal and a DC voltage, a receiving terminal of the bias voltage controller can receive a first second-order harmonic component signal from the optical modulator, wherein a second second-order harmonic component signal with a frequency equal to a frequency of the first second-order harmonic component signal is generated in the bias voltage controller and is compared with the first second-order harmonic component signal, so as to produce the DC voltage used to control the bias voltage on the optical modulator, the method comprising:

switching the receiving terminal to a ground voltage when the bias voltage controller is at a measuring cycle;

measuring an extra offset voltage and a zero shifting voltage induced by the bias voltage controller;

switching the receiving terminal to receive the first second-order harmonic component signal when the bias voltage controller is at a correcting cycle;

obtaining a DC error voltage by comparing the first second-order harmonic component signal with the second second-order harmonic component signal;

subtracting the extra offset voltage and the zero shifting voltage from the DC error voltage; and using the DC error voltage after subtraction to control the bias voltage on the optical modulator.

2. The method of claim 1, wherein the step of obtaining the DC error voltage includes comparing an amplitude of the first second-order harmonic component signal with an amplitude of the second second-order harmonic component signal.

3. The method of claim 1, before the step of subtracting the extra offset voltage and the zero shifting voltage from the DC error voltage, further comprising amplifying the DC error voltage and shifting a voltage level of the DC error voltage.

4. The method of claim 1, wherein periods of the measuring cycle and the correcting cycle can be adjusted according to a varying rate of temperature.

5. An apparatus for automatic correcting a bias voltage on an optical modulator of an external-modulation optical emitter, when the optical modulator receives a base control signal provided by a bias voltage controller, a receiving terminal of the bias voltage controller can receive a first second-order harmonic component signal from the optical modulator, wherein the apparatus generates a DC voltage, according to the first second-order harmonic component signal, to control the bias voltage on the optical modulator, the apparatus comprising:

a base signal generator, used to generate a base signal and a second second-order harmonic component signal based on the base signal;

a combiner, used to electrically connect to the base signal generator and receive the DC voltage, and to export the bias control signal to the optical modulator;

an optical coupler, used to receive and export the first second-order harmonic component signal;

an optical receiver, used to receive the first second-order harmonic component signal exported by the optical coupler;

a resistor, having a first terminal and a second terminal, the second terminal of the resistor is grounded;

a RF switch, used to select one connection from the group consisting of receiving the first second-order harmonic component signal from the optical receiver and connecting to a first terminal of the resistor;

a wave detector, used to electrically connect to the base signal generator and the RF switch, and export the first second second-order harmonic component signal, the second second-order harmonic component signal, and a DC error voltage signal;

a first low-pass filter, used to receive the first second second-order harmonic component signal, the second second-order harmonic component signal, and the DC error voltage signal;

a DC amplifier, coupled to the first low-pass filter;

a second low-pass filter, coupled to the DC amplifier;

a DC level shifter, coupled to the second low-pass filter;

an analog-to-digital converter (ADC), coupled to the DC level shifter;

a microprocessor, coupled to the ADC and the RF switch; and a digital-to-analog converter (DAC), coupled to the microprocessor and the combiner, so as to export the DC error voltage signal.

6. The apparatus of claim 5, wherein the RF switch includes a semiconductor switch.

7. The apparatus of claim 5, wherein the RF switch includes a relay.

8. The apparatus of claim 5, wherein the wave detector includes a multiplying wave detector.

9. The apparatus of claim 5, wherein the wave detector includes a diode wave detector.

10. The apparatus of claim 5, wherein the wave detector includes an integrated circuit.

11. The apparatus of claim 5, wherein the wave detector includes a discrete circuit.

12. The apparatus of claim 11, wherein the discrete circuit includes a transistor, a field-effect transistor, or an operational amplifier.

13. The apparatus of claim 5, wherein the low-pass filters include a passive device of one selected from the group consisting of a capacitor, a resistor, and an inductor.

14. The apparatus of claim 5, wherein the low-pass filters include an active device of one selected from the group consisting of a transistor, a field-effect transistor, and an operational amplifier.

15. The apparatus of claim 5, wherein the DC amplifier includes an active device of one selected from the group consisting of a transistor, a field-effect transistor, and an operational amplifier.

16. The apparatus of claim 5, wherein the ADC includes an integrated circuit.

17. The apparatus of claim 5, wherein the ADC includes a discrete circuit.

18. The apparatus of claim 17, wherein the discrete circuit includes a transistor, a field-effect transistor, or an operational amplifier.

19. The apparatus of claim 5, wherein the DAC includes an integrated circuit.

20. The apparatus of claim 5, wherein the DAC includes a discrete circuit.

21. The apparatus of claim 20, wherein the discrete circuit includes a transistor, a field-effect transistor, or an operational amplifier.

\* \* \* \* \*